United States Patent [19]

Robles

[11] 4,329,197
[45] May 11, 1982

[54] PLASTIC BAG SEALER

[76] Inventor: Leon G. Robles, 2740 Prune Ridge Ave., Santa Clara, Calif. 95051

[21] Appl. No.: 170,578

[22] Filed: Jul. 21, 1980

[51] Int. Cl.³ .......................... B32B 31/00; B30B 5/02; F24C 3/00; B44B 7/02
[52] U.S. Cl. .................................. 156/583.4; 156/497; 156/583.1; 126/231; 126/406; 493/470
[58] Field of Search ................. 156/580, 499, 497, 82, 156/579, 583.1, 583.4; 93/DIG. 1; 126/412, 411, 406, 401, 239, 229, 230, 231; 100/266; 493/470

[56] References Cited

U.S. PATENT DOCUMENTS

| | | | |
|---|---|---|---|
| 2,157,054 | 5/1939 | Gammeter | 93/DIG. 1 |
| 2,305,010 | 12/1942 | Kenney et al. | 93/DIG. 1 |
| 2,589,510 | 3/1952 | Ratner | 126/229 |
| 2,610,137 | 9/1952 | Williamson et al. | 93/DIG. 1 |
| 3,408,478 | 10/1968 | Penn | 156/499 |

FOREIGN PATENT DOCUMENTS 1003203  9/1965  United Kingdom .................. 156/82

Primary Examiner—Edward C. Kimlin
Assistant Examiner—L. Falasco
Attorney, Agent, or Firm—Paul L. Hickman

[57] ABSTRACT

A portable, flame powered sealer including a sleeve-like body portion receptive to a standard, throw-away type cigarette lighter, a pair of upwardly extending brackets, a heating element held over the flame of the lighter by the brackets, and a compression member pivotally attached to one of the brackets for pressing a portion of the bag proximate its mouth against the heating element.

8 Claims, 5 Drawing Figures

PLASTIC BAG SEALER

BACKGROUND OF THE INVENTION

1. Field of the Invention

This invention relates generally to heat sealers and more particularly to heat sealers adapted to seal the mouths of plastic bags.

2. Description of the Prior Art

Plastic bags are used for a great variety of packaging purposes. Properties including low cost, flexibility, transparency, gas and fluid impermeability, thermal stability and sterilizability make them desirable containers for everything from electronic parts to pre-cooked 'boilable' foods.

It is often desirable to form an air-tight seal at the mouth of a plastic bag to securely retain the bag's contents and/or to protect the bag's contents against spoilage. A machine known as a heat sealer is typically used to seal the plastic bag by melting a seam between the sides of the bag proximate to its mouth.

A problem with prior art heat sealers is that they are, for the most part, non-portable devices. First of all, they are usually large, heavy devices designed to efficiently seal mass quantities of bags. Secondly, they are almost universally electrically powered, and thus must be used near to an electrical outlet.

In U.S. Pat. No. 3,408,478, J. D. Penn discloses a tool for welding the edges of plastic sheets together. Penn's device is a portable tool including a handle, an elongated heating element having a single loop of resistance wire, and a battery disposed within the handle for heating the resistance wire. The heated wire partially melts the plastic sheets to weld them together.

A possible drawback of Penn's device is that it is battery powered. It is a well documented fact that heat production is one of the most energy inefficient uses of electricity, leading to the conclusion that Penn's device would not be able to weld many plastic sheets together before its battery was exhausted.

A number of nineteenth and early twentieth century patents, notably U.S. Pat. Nos. 598,562, 591,677, 337,135 and 1,052,984, describe attachments for kerosene lamps which become heated by the lamp's flame. The attachments are universally used for heating beverages, foods and the like and never addressed the problem of heat sealing plastic bags.

What the prior art fails to disclose, then, is a simple, efficient and portable device for heat-sealing plastic bags.

SUMMARY OF THE INVENTION

It is the major object of this invention to produce a mechanically non-complex, heat efficient and portable device for heat-sealing plastic bags.

Briefly, a preferred embodiment of this invention includes a sleeve-like body portion receptive to a standard disposable cigarette lighter, a pair of upwardly extending brackets, a heating element held by the brackets above the cigarette lighter's flame and a compression member pivotally attached to one of the brackets for selectively pressing a portion of its surface against the heating element. In use, the cigarette lighter is activated to heat the heating element, and then the flame is extinguished. A section of the plastic bag near its mouth is placed against the heating element and the compression member is activated to tightly press the bag against the element. If the mouth of the bag is longer than the length of the heating element the bag is pulled laterally across the heating element or sealed by a series of smaller seals.

An advantage of this invention is that inexpensive, long-lasting disposable cigarette lighters can be used to power a portable heat sealing device.

A further advantage of this invention is that its portability and independence from electrical power sources allows it to be used to seal plastic bags almost anywhere.

Yet another advantage of this invention is its structural simplicity which allows for low cost production and for years of rugged, dependable use.

These and other objects and advantages of the present invention will no doubt become apparent upon a reading of the following descriptions and a study of the several figures of the drawing.

IN THE DRAWING

DETAILED DESCRIPTION OF THE PREFERRED EMBODIMENT

Referring generally to the figures, a portable plastic bag sealer in accordance with the present invention includes a body portion 10, a pair of upwardly extending brackets 12 and 14, a heating element 16 and a compression member 18. As will be discussed in more detail subsequently, brackets 12 and 14 support both the heating element and the compression member.

Figure 1:
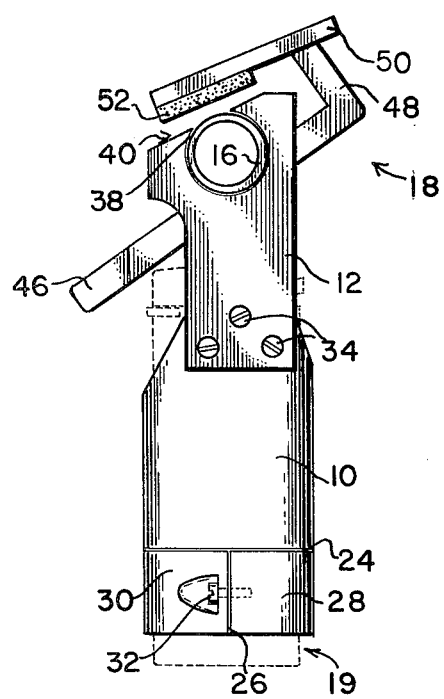
FIG. 1 is a side elevational view of a plastic bag sealer in accordance with the present invention.
Figure 2:
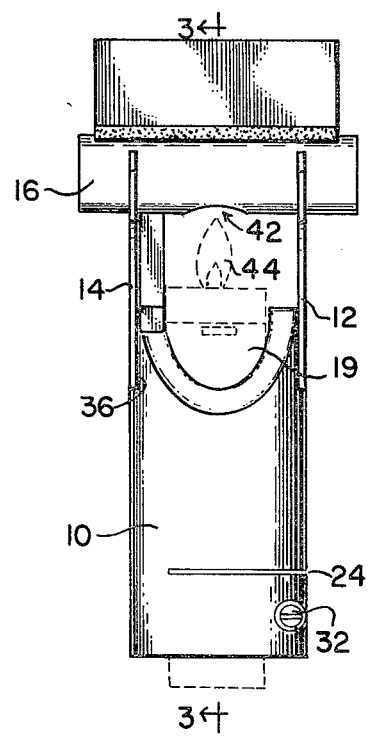
FIG. 2 is a front elevational view of the plastic bag sealer shown in FIG. 1.
Figure 3:
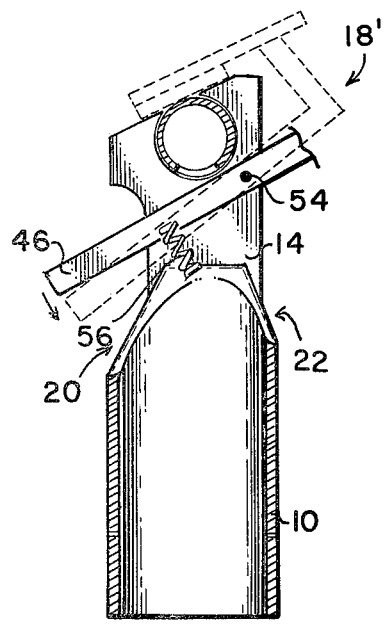
FIG. 3 is a cross-sectional view taken along line 3—3 of FIG. 2.
Figure 4:
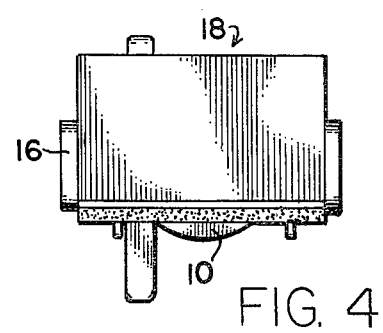
FIG. 4 is a top plan view of the plastic bag sealer of FIG. 1.
Figure 5:
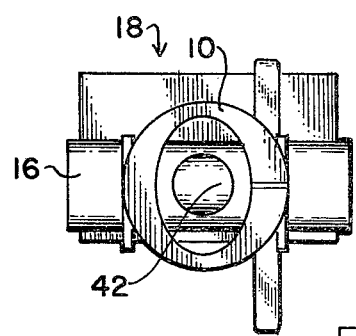
FIG. 5 is a bottom plan view of the plastic bag sealer shown in FIG. 1.

With added reference to FIGS. 3 and 5, the body portion 10 can be seen to be a substantially hollow, cylindrical structure having an inside surface adapted to receive a standard disposable cigarette lighter (shown in phantom at 19 in FIGS. 1 and 2). The embodiment shown is constructed to fit a bic TM type disposable lighter and thus the inner surface of the body portion is substantially oval in shape. Of course, other types of disposable lighters, or even permanent lighters, could be used in suitably modified versions of this device. As seen at both 20 and 22, sections of the main body's wall are removed to allow the controls of the lighter to be easily accessed.

As best seen in FIGS. 1 and 2, a lateral slot 24 and a vertical slot 26 are formed into the side of the main body portion to create a pair of main body sections 28 and 30. A recessed screw couples sections 28 and 30 together and provides a mechanism for removably attaching the cigarette lighter within the main body. When screw 32 is loosened, the main body sections move apart to allow cigarette lighter 19 to slide into the main body. As screw 32 is tightened sections 28 and 30 come together to tightly hold the lighter within the main body.

Brackets 12 and 14 extend upwardly from the main body portion and are attached to the main body by fasteners such as machine screws 34. In the present embodiment, the brackets are stamped or machined from a thick sheet metal material and engage recesses 36 machined into the sides of the main body portion. The brackets are vertically elongated and are provided with apertures, such as the one shown at 38, which are configured to receive ends of the heating element 16. An angled surface 40 of each of the brackets is formed to align with the end of compression member 18. The brackets are preferably made from a material of low thermal conductivity so as not to conduct heat from the heating element to the main body portion.

Heating element 16 is shown to be a tubular structure provided with a flame-hole 42 receptive to a flame 44 of the cigarette lighter. The flame-hole allows the heating element to be more evenly heated by directing heated air down the length of the element and out of its ends. The flame-hole also prevents the build-up of soot an the exterior of the heating element. As shown, the heating element slidingly engages the apertures 38 of the brackets. The heating element is preferably made from a material of high thermal conductivity such as copper, brass or steel.

Referring to FIGS. 1 and 3, the compression member 18 can be seen to include an elongated lever-arm 46 having an offset portion 48, a pressure plate 50 and a pressure pad 52. The lever-arm is pivotally attached to bracket 14 by a pivot 54. An expansion spring 56 biases the pressure plate and pad away from the heating element.

As best seen in FIG. 3, the compression member can be pivoted to a new position 18' by depressing the lever-arm 46 against the pressure exerted by the spring, causing pressure pad 52 to press tightly against the heating element. Preferably, the pad 52 is made from a heat resistant but flexible material so that it will conform to the rounded contours of the heating element and provide a maximum amount of surface contact.

In use, a cigarette lighter is disposed within body portion 10 and retained therein by the mechanism described previously. The lighter is activated to produce flame 44 which is left on sufficiently long to thoroughly heat element 16. The lighter is then shut off to extinguish the flame.

A portion of a plastic bag near its mouth is placed against the heating element and lever-arm 46 is depressed so that the pressure pad 52 presses the bag firmly against the heating element. If the mouth of the bag is wider than the heating element, and this would be most of the time, the bag can be pulled laterally across the heating element to produce a seam running the full width of the bag. Alternatively, the mouth of the bag could be sealed by producing a series of smaller seams across the width of the bag.

While this invention has been described in terms of a single, preferred embodiment, it is contemplated that those reading the preceding descriptions and studying the drawing will realize various alterations and permutations thereof. For example, there are any number of ways of attaching a body portion to a cigarette lighter besides the one described above for the purpose of example. Further, an embodiment of this invention includes a permanent lighter built within body portion 10. While the various members of this invention with the exception of the brackets are preferably made from metallic materials, any suitable alternative material could be used. Likewise, the construction of the heating elements and the compression member as described could easily be modified.

It is therefore intended that the following appended claims be interpreted as including all such alterations and permutations as fall within the true spirit and scope of the present invention.

What is claimed is:

1. A portable plastic bag sealer utilizing a lighter as a heat source and comprising:
   a. A support structure including a body portion having an upper end and provided with a void receptive to a lighter, means for clamping at least a part of said body portion around said lighter so that a flame produced by said lighter is proximate said upper end, and a bracket portion coupled to said body portion and extending away from said upper end;
   b. A tubular heating element supported horizontally relative an upper and a lower surface of said lighter by said bracket portion in proximity to said upper end of said body portion, said tubular heating element having a centrally located hole for receiving a flame of said lighter and having a heated surface when said lighter is producing a flame; and
   c. Compression means including an elongated lever arm pivotally attached to said bracket portion, a pressure plate attached to said lever arm, a heat resistant pressure pad attached to said pressure plate, and spring means biasing said pressure plate away from said heating element, said compression means being adapted to selectively press a portion of a plastic bag against said heated surface.

2. A portable plastic bag sealer as recited in claim 1 wherein said bracket portion is made from a thermally insulative material.

3. A portable plastic bag sealer utilizing a lighter as a heat source and comprising:
   a. A support structure including a body portion having an upper end, means for removably attaching a lighter to said body portion so that a flame produced by said lighter is proximate said upper end, and a bracket portion coupled to said body portion and extending away from said upper end;
   b. A tubular heating element supported by said bracket portion substantially perpendicularly to said lighter, said heating element being provided with a centrally located hole receptive to said flame and having a heatable surface; and
   c. Compression means pivotally attached to said support structure and having a compression surface adapted to selectively press a portion of a plastic bag against said heatable surface.

4. A portable plastic bag sealer as recited in claim 3 wherein said body portion is provided with a void receptive to said lighter.

5. A portable bag sealer as recited in claim 3 wherein said means for removably attaching said lighter to said body portion includes means for clamping at least a part of said body portion around said lighter.

6. A portable bag sealer as recited in claim 3 wherein said compression means includes an elongated lever arm pivotally attached to said bracket portion, a pressure plate attached to said lever arm, and means biasing said pressure plate away from said heating element.

7. A portable bag sealer as recited in claim 6 wherein said compression means further includes a heat resistant pressure pad attached to said pressure plate.

8. A portable bag sealer as recited in claim 3 wherein said bracket portion is made from a thermally insulative material.

* * * * *